March 18, 1941.   H. J. REITER   2,235,168
SNAP FASTENER
Filed April 5, 1940
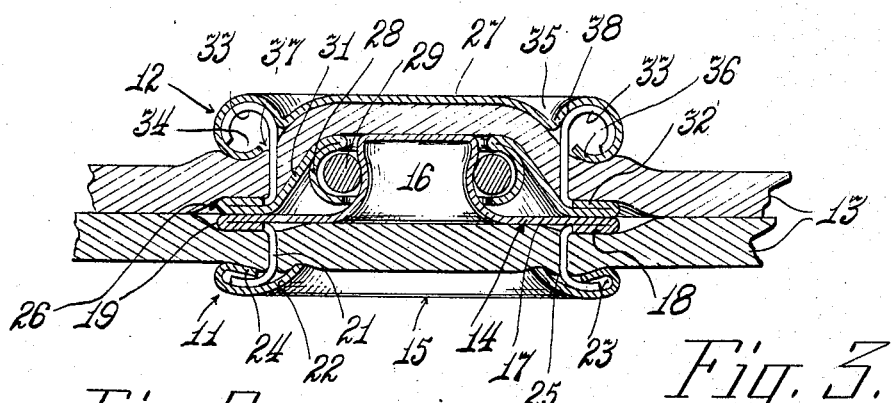
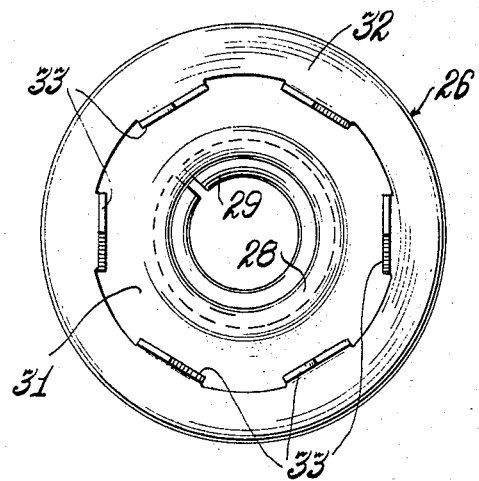
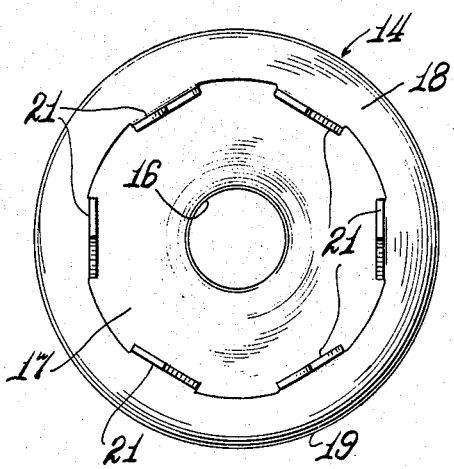
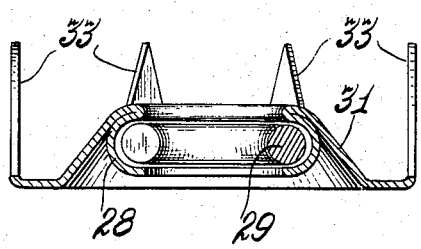
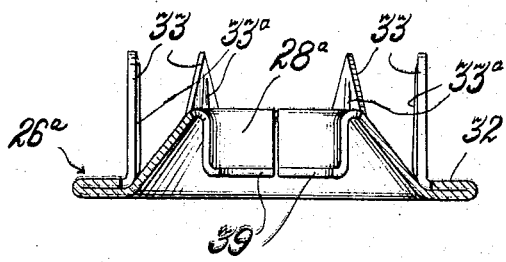
INVENTOR
HAROLD J. REITER
Elmer L. Quickel
ATTORNEY Patented Mar. 18, 1941

2,235,168

UNITED STATES PATENT OFFICE 2,235,168

SNAP FASTENER

Harold J. Reiter, Chicago, Ill.

Application April 5, 1940, Serial No. 327,969

5 Claims. (Cl. 24—218)

The invention relates to improvements in separable snap fasteners and more particularly to structurally improved socket and stud members.

An object of the invention is to provide improved male and female snap fastener elements with integral tangs arranged to pierce the material to which the elements are attached; the tangs being located thereon so as to be wholly concealed when the elements are mounted.

Another object is to provide male and female snap fastener elements with integral piercing tangs arranged inwardly of their circumferential margin whereby said elements present a smooth unbroken reinforced periphery.

Another object is to provide male and female snap fastener elements with means integral therewith arranged to pass through the material on which the elements are mounted and interlockingly engage in and be clinched by associated attaching elements.

Another object is to provide an attaching element of a type having a channel therein arranged to receive tangs and means to direct such tangs into said channel.

Another object is to provide an efficient inexpensively constructed reinforced snap fastener embodying simple readily attached elements.

The foregoing and such other objects of the invention as will become more readily apparent as the description proceeds, will be more readily understood from a perusal of the following specification; in which reference is had to the accompanying drawing, wherein:

Fig. 1 is an enlarged longitudinal central sectional view of the snap fastener.

Fig. 2 is a plane view of the rear or tanged face of the socket element.

Fig. 3 is an inverted plane view of the stud element showing the tangs thereon.

Fig. 4 is a longitudinal central sectional view through a modified form of socket element.

Fig. 5 is a view similar to Fig. 4, showing another modification.

All reference numerals used herein identify corresponding parts in the drawing.

Referring particularly to the form of snap fastener illustrated in Figs. 1 to 3 inclusive, such snap fastener includes male and female members 11 and 12. Said members are secured respectively, to separate complemental portions of fabric, leather or other suitable material 13 and are arranged to detachably interlock to hold said portions together.

As best shown in Figs. 1 and 3, the male member 11 consists of a circular stud element 14 and an attaching element 15. The stud element 14 is formed integral preferably from a thin circular sheet of metal. A substantially cylindrical wall 5 defines the body or stud portion 16 which is formed by striking or drawing the metal of the sheet upwardly. The stud portion preferably is closed at its top and its cylindrical wall bows outwardly and then tapers inwardly downwardly and finally outwardly to merge with a circular flange or breast portion 17. The flange 17 lies in a substantially horizontal plane and its outer circumferential margin is turned downwardly and then inwardly against the bottom face of said flange to provide an integral reinforcing ring 18 and a smooth rolled circumferential outside edge 19 on the stud element. A plurality of pointed tangs 21 are formed integral with the free inner circumferential edge of the ring 18. These tangs preferably are spaced apart circumferentially and extend downwardly substantially at right angles to the plane of the flange 17.

To mount a male member, its stud element 14 is placed over one face of the material 13 with its body or stud 16 disposed away from said material. The pointed tangs 21 are then forced through the material until the circumferential ring 18 rests upon the face thereof. The attaching element 15, which may take the form of an internally channelled ring of sheet metal, is placed in axial alignment with the stud element against the other face of the material 13 prior to the piercing operation. As best shown in Fig. 1, one circular wall 22 of the attaching element 15 is inclined inwardly and upwardly towards the bottom face of the material 13 so as to present a gradually curved surface which is contacted by the free ends of the tangs 21 when the latter are initially pressed downwardly thereagainst. Continued pressure causes the tangs to curl or roll outwardly radially over said curved surface into the circumferential channel 23 of said attaching element.

Although the mounting operation may be accomplished by hand, it preferably is effected by the use of a suitable press and as the limit of the pressing stroke is approached the upper circular wall 24 of the channelled attaching element 15 is pressed downwardly to clinch the curled ends of the tangs tightly within the channel. This prevents separation of the male and attaching elements and clamps the material securely therebetween. As attached, the tangs are wholly concealed from view due to their being spaced inwardly from the circumferential margin of the stud element 14.

It is apparent that the tangs 21 cannot first be driven through the material and then carefully fitted into the channelled attaching element 15. Accordingly, the annular entrance slot 25, defined by the inner circumferential edges of the curved wall 22 and the upper circular wall 24 of said attaching element, is considerably wider than the thickness of the metal forming the tangs. Consequently, whether the circle defined by the pointed ends of the circumferentially spaced tangs 21 is under or over size said tangs will always pass freely through the annular slot and engage the curved surface of the wall 22. It should be observed that the curvature of the wall 22 is substantially uniform throughout its width so as to cause the end of the tangs always to contact an outwardly sloping surface and buckling of the tangs is avoided.

The female member 12 preferably consists of a circular socket element 26 and an attaching element or cap 27. The socket element 26 also preferably is formed from a thin circular sheet of metal having its body or center portion struck or drawn out of the plane thereof and suitably rolled to provide an internally channelled socket wall 28. A split resilient ring 29 is carried in the channelled socket wall 28 to provide resilient means for yieldingly engaging the body or stud 16 of the male member 11 when said stud is inserted therein as shown in Fig. 1. The upper end of the socket wall 28 terminates in a circular flange or breast portion 31 which extends downwardly and outwardly and preferably has its outer margin terminating in a plane below the plane of the stud receiving end of the socket. This construction protects the socket wall 28 from being damaged should the material carrying the female member be dropped or stepped upon. The structure also prevents damage of the socket wall while the material is being ironed.

The outer circumferential margin of the circular flange 31 is turned upwardly and inwardly to define an inwardly directed reinforcing ring 32 and a smooth rolled outer edge on the flange. A plurality of pointed piercing tangs 33 are formed integral with the free inner edge of the ring 32 and extend substantially at right angles thereto.

To mount the female member, the socket element 26 is placed over one face of the material 13 with its tangs 33 in contact therewith. When pressure is applied, the tangs are forced through the material and pointed ends curl outwardly radially into an inwardly opening circumferential channel 34 formed in the attaching element 27. The attaching element or cap 27 illustrated, preferably is formed of a thin circular sheet of metal, but obviously it may be formed of any suitable material such as wood, bone or some shape retaining composition. The cap 27 has an annular corrugation or ridge 35 on its inside face spaced inwardly from the inner circumferential edge of the rolled over marginal flange defining the channel 34. The annular ridge 35 and the free inner edge of the channel flange constitute the inner and outer edges of an annular entrance slot 37 through which the tangs 33 pass when the elements are assembled. During the assembly operation the outwardly and upwardly inclined surface 38 formed by the outer surface of the annular corrugation 35 is initially contacted by the pointed ends of the tangs, consequently said tangs always curl outwardly radially into the channel 34.

It should be apparent that either the cap 27 or the channelled ring 15 may be used as an attaching element for either of the male or female fastener elements shown, and that the different attaching elements are illustrated for the purpose of disclosure. It also is evident that the improved fastener members are not readily damaged and are not liable to tear or pull through the fabric to which they are attached. These advantageous features are primarily afforded by the presence of the integral reinforcing rings on the circumferential margins of the flanges. The rings stiffen the flanges; consequently said flanges are not bent or otherwise distorted readily and the rolled edge prevents cutting through the fabric and the resulting pulling out of the fastener member.

Fig. 4 shows a socket element 26a constructed substantially like that illustrated in Fig. 1 except that in this instance the stud receiving socket consists of a cylindrical wall 28a extending downwardly from the upper inner end of a downwardly and outwardly inclined circular flange or breast portion 31a. The lower free edge of said socket wall is rolled inwardly to provide a stud engaging lip or bead 39. The cylindrical wall 28a is suitably slit at one or more points inwardly from its beaded free end to define a plurality of resilient fingers adapted to yield when a stud is admitted or withdrawn therefrom. In this structure, the flange or breast portion 31a also extends to a point in advance of or below the beaded end of the cylindrical socket wall 28a to afford suitable protection therefor, and its outer circumferential margin is rolled upwardly and inwardly to provide a reinforcing ring 32. Obviously, the tangs 33 carried on ring 32 may, after being pressed through the material, be engaged either by the cap 27 or the attaching ring 15, and said tangs also are concealed when the fastener member is mounted. Reinforcing ribs 33a preferably are struck in said tangs to reinforce and prevent unwarranted bending or buckling thereof.

The socket illustrated in Fig. 5 is substantially like that shown in Fig. 1 except that it has no reinforcing ring on its circumferential edge and the piercing tangs 33 extend substantially at right angles to the flat face of the circular flange 31.

Although exemplary forms of construction have been illustrated and described, it is to be understood that the disclosure is illustrative rather than restrictive and that the invention is not to be limited thereby but is to embrace such variations as will fall within the spirit of the invention and the scope of the appended claims.

I claim:

1. A snap fastener socket installation comprising, in combination, a socket element made from a single piece of sheet material and having an annular internally channelled socket wall, a split ring in said channel, a circular flange integral with and extending downwardly and outwardly from the upper end of the channelled wall and having its outer marginal portion disposed in a plane below the plane of the lower end of the said wall, the free circumferential edge portion of said margin being folded upwardly and inwardly to provide a reinforcing ring lying against the top surface of said marginal portion, and a plurality of piercing tangs integral with the free edge of said reinforcing ring and extending upwardly substantially at right angles thereto; a sheet of supporting material disposed over the socket element with the tangs extending therethrough; and an attaching element disposed over said material having an inwardly opening circumferential channel to receive said tangs, said attaching element having its bottom face shaped to conform substantially to the top surface contour of the socket element and including means to deflect the free ends of the tangs outwardly into said channel when the two elements are pressed together.

2. A snap fastener installation comprising: a socket element having a stud receiving socket, a circular flange integral with the upper end of said socket extending outwardly and downwardly therefrom and terminating in a flat marginal portion disposed in a plane below the lower end of said socket, the free circumferential edge portion of said margin being folded upwardly and inwardly to provide a reinforcing ring lying against the top surface of said marginal portion, a plurality of piercing tangs on the inner circumferential edge of said ring adapted to extend through a sheet of material against one face of which the socket element is disposed, and an attaching element on the other face of said material to receive said tangs; and cooperating with said socket element a stud element including a stud with a contracted neck received in said socket, a flat circular flange extending from one end of said stud and disposed to be engaged by the bottom surface of the flat marginal portion of the socket element, said flange having its outer marginal edge folded downwardly and inwardly to define an annular reinforcing ring arranged to lie against the bottom face of said flange, a plurality of piercing tangs on the inner edge of said ring adapted to extend through a related sheet of material against one face of which the socket element is disposed, and an attaching element on the other face of the related sheet of material to receive said tangs, said flat marginal portion, circular flange and reinforcing rings forming a short cylindrical laminated wall protecting the socket and stud.

3. A one piece snap fastener socket element comprising, in combination, a cylindrical wall, an internal flange on the lower end of said wall, said internal flange and wall having a plurality of slits therein to provide resilient stud engaging fingers, an external flange integral with and extending downwardly and outwardly from the upper end of said wall and having its outer marginal portion disposed in a plane parallel to and below the plane of the flanged lower end of said wall, said external flange having its outer circumferential edge folded upwardly and inwardly to define a reinforcing ring lying against the top surface of said marginal portion, and a plurality of piercing tangs integral with the free inner edge of said ring and extending upwardly substantially at right angles thereto.

4. A one-piece snap fastener socket element comprising, in combination, a substantially cylindrical socket wall, an internal flange on the lower end of said wall, said flange and wall having a plurality of slits therein to provide resilient stud engaging fingers, an external circular flange integral with and extending downwardly and thence outwardly from the upper end of said wall and having its outer marginal portion disposed in a plane parallel to the plane of the flanged lower end of said wall, and a plurality of piercing tangs integral with and spaced inwardly from the outside circumferential edge of said marginal portion, said tangs extending upwardly substantially at right angles to the plane of said marginal portion and terminating above the plane of the top of the socket wall.

5. A snap fastener socket element comprising, in combination, a stud receiving resilient socket, a circular flange integral with and extending downwardly and outward from the upper end of the socket and having its free end disposed in a plane below the plane of the lower end of said socket, the outer circumferential margin of said flange being folded upwardly and inwardly to lie against the top surface of said flange, and a plurality of piercing tangs integral with the free inner edge of said folded margin and extending upwardly substantially at right angles thereto.

HAROLD J. REITER.